US007560062B2

(12) United States Patent
Gould et al.

(10) Patent No.: US 7,560,062 B2
(45) Date of Patent: *Jul. 14, 2009

(54) HIGH STRENGTH, NANOPOROUS BODIES REINFORCED WITH FIBROUS MATERIALS

(75) Inventors: George L. Gould, Mendon, MA (US); Je Kyun Lee, Brookline, MA (US); Christopher J. Stepanian, Somerville, MA (US); Kang P. Lee, Sudbury, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/180,038

(22) Filed: Jul. 12, 2005

(65) Prior Publication Data

US 2007/0222116 A1 Sep. 27, 2007

Related U.S. Application Data

(60) Provisional application No. 60/587,122, filed on Jul. 12, 2004.

(51) Int. Cl.
*C01B 33/152* (2006.01)
(52) U.S. Cl. .................. 264/321; 516/111; 516/112
(58) Field of Classification Search .............. 264/321; 516/112
See application file for complete search history.

(56) References Cited

U.S. PATENT DOCUMENTS 4,105,738 A * 8/1978 Rohn ..................... 264/163
4,788,925 A * 12/1988 Simon et al. ............. 114/69
5,731,360 A 3/1998 Pekala et al.
6,132,837 A 10/2000 Boes et al.
6,670,402 B1 12/2003 Lee et al.
2002/0025427 A1 2/2002 Schwertfeger et al.
2002/0094426 A1 7/2002 Stepanian et al.
2003/0003284 A1 1/2003 Schwertfeger et al.
2004/0142149 A1 7/2004 Mollendorf et al.
2005/0046086 A1 3/2005 Lee et al.
2007/0163666 A1* 7/2007 Lee et al. ................ 138/149

OTHER PUBLICATIONS

Levelut, E., et al. "Brillouin scattering investigation of elastic properties and phonon-fracton crossover in uniaxially pressure-densified aerogels", Internet accessed on Jul. 8, 2005 at: http://w3.Idv.univ-montp2.fr/'Claire/PAGEPERSO/ISAART4C/ISAART4C.html.
Howard, W.M., et al. "Shock Propagation and Instability Structures in Compressed Silica Aerogels", Paper submitted to *International Workshop, New Models and Hydrocodes for Shock Wave Processing Condensed Matter*, Edinburgh, UK, May 2002, (Preprint) 2002:1-7.
Scherer, George W., et al. "Compression of aerogels", *Journal of Non-Crystalline Solids* (1995) 186:316-320.

* cited by examiner

*Primary Examiner*—Mary Lynn F Theisen
(74) *Attorney, Agent, or Firm*—Poongunran Muthukumaran

(57) ABSTRACT

This invention discloses improvements that can be achieved in thermal or mechanical performance of aerogel composites via densification. Densified aerogels and aerogel composites can display higher compressive strength, modulus, flexural strength, and maintains or insubstantially increases the thermal conductivity relative to the pre-densified form. In the special case of fiber reinforced aerogel composites densification via mechanical compression can prove highly beneficial.

31 Claims, 9 Drawing Sheets

HIGH STRENGTH, NANOPOROUS BODIES REINFORCED WITH FIBROUS MATERIALS

CROSS REFERENCE TO RELATED APPLICATIONS

This application claims the benefit of U.S. provisional application No. 60/587,122, filed Jul. 12, 2004, which is hereby incorporated by reference in its entirety.

BACKGROUND OF THE INVENTION

1. Field of the Invention

The present invention relates generally to aerogel composite materials. More specifically, the present invention relates to densified aerogels and densified aerogel composite materials and methods of preparing the same.

2. Description of the State of Art

Low-density materials have been developed to solve a number of thermal isolation problems where the insulation core material experiences high pressures. For instance, polymeric materials have been compounded with hollow glass microspheres to create syntactic foams, which are typically very stiff, compression resistant materials. Syntactic materials are well known as insulators for underwater oil and gas pipelines and support equipment. However, syntactic materials are relatively inflexible and exhibit high thermal conductivity relative to flexible aerogel composites (aerogel matrices reinforced by fibers.)

Aerogels describe a class of material based upon their structure, namely low density, open cell structures, large surface areas (often 900 $m^2/g$ or higher) and sub-micron scale pore sizes. Supercritical and subcritical fluid extraction technologies are commonly used to extract the solvent from the fragile cells of the material. A variety of different aerogel compositions, both organic and inorganic are known in the art. Inorganic aerogels are generally based on metal alkoxides and include materials such as silica, zirconia, titania, alumina, carbides and many others. Organic aerogels can include carbon aerogels and polymeric aerogels such as polyimides aerogels.

Low density aerogels (0.02-0.2 g/cc) based on silica are excellent insulators, better than the best rigid foams with thermal conductivities of 10 mW/m-K and below at 100° F. and atmospheric pressure. Aerogels function as thermal insulators primarily by minimizing conduction (low density, tortuous path for heat transfer through the nanostructures), convection (very small pore sizes minimize convection), and radiation (IR suppressing dopants may easily be dispersed throughout the aerogel matrix). Depending on the formulation, they can function well at temperatures of 550° C. and above. However, in a monolithic state they tend to be fragile and brittle and are thus not well suited for most applications outside of the laboratory. The aerogel materials presented herein, address such requirements.

BRIEF SUMMARY OF THE INVENTION

This invention discloses improvements that can be achieved in thermal or mechanical performance of aerogel composites via densification. Densified aerogels and aerogel composites can display higher compressive strength, modulus, flexural strength, and maintains or insubstantially increases the thermal conductivity relative to the pre-densified form. In the special case of fiber reinforced aerogel composites densification via mechanical compression can prove highly beneficial.

This invention further discloses an aerogel composite which exhibits improved performance over prior aerogel composites in one or more of the areas of flexibility, durability, aerogel sintering, x-y thermal and/or electrical conductivity, RFI and EMI attenuation, and burn-through resistance.

More specifically, the invention is also directed to a composite having two parts, namely reinforcing fibers and an aerogel matrix wherein the reinforcing fibers are in the form of a lofty fibrous structure (i.e. batting), preferably based upon either thermoplastic polyester or silica fibers, and more preferably in combination with individual randomly distributed short fibers (microfibers). The use of the lofty batting reinforcement minimizes the volume of unsupported aerogel while generally improving the thermal performance of the aerogel, rather than degrading it as in the prior art. Moreover, when an aerogel matrix is reinforced by a lofty batting material, particularly a continuous non-woven batting comprised of very low denier fibers, the resulting composite material at least maintains the thermal properties of a monolithic aerogel in highly flexible, drapeable form, making the composite suitable, for instance, for clothing applications.

Under very high heat loads, such as those generated by direct surface impingement of a gas/oxygen torch flame, monolithic aerogels can rapidly sinter and shrink within seconds. When the aerogels are reinforced by the combination of the lofty fibrous batting and microfibers, as in one embodiment of this invention, the rate of shrinkage, sintering, and ultimate failure of the insulation structure can be delayed by one or more orders of magnitude time, i.e. increasing burn through from seconds to hours.

Still more specifically, an aerogel composite further including a thermally conductive layer has been found helpful in improving the thermal performance of the composite. For example, carbon fiber cloth or two orthogonal plies of unidirectional carbon fiber placed at the center of a composite provide a thermal breakthrough barrier under a high heat load, a high degree of IR opacification, and a thermally dissipative layer structure that will spread the heat out in the x-y plane of the composite. More specifically, the thermally conductive layer in the middle, through the thickness, of the aerogel composite can be selected to have a minimal effect on the stiffness of the composite. Moreover, if desired the layer can have malleability or intrinsic conformability so that the resulting aerogel composite will be conformable, e.g. a copper wire mesh placed at the interlayer of the aerogel composite article confers conformability and deformability when the composite is bent. In addition, the conductive mesh also provides RFI and EMI resistance.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

BRIEF DESCRIPTION OF THE DRAWINGS

The accompanying drawings, which are incorporated herein and form a part of the specification, illustrate non-limiting embodiments of the present invention, and together with the description, serve to explain the principles of the invention.

In the Figures.

DETAILED DESCRIPTION OF THE INVENTION

According to embodiments presented herein, improved aerogel composite structures with exceptionally low thermal conductivity at an increased density can be prepared. This is largely due to the finding that aerogel composites can retain or increase insubstantial amounts in thermal conductivity (commonly measured in mW/m-k) upon densification, particularly via mechanical means.

Figure 9:
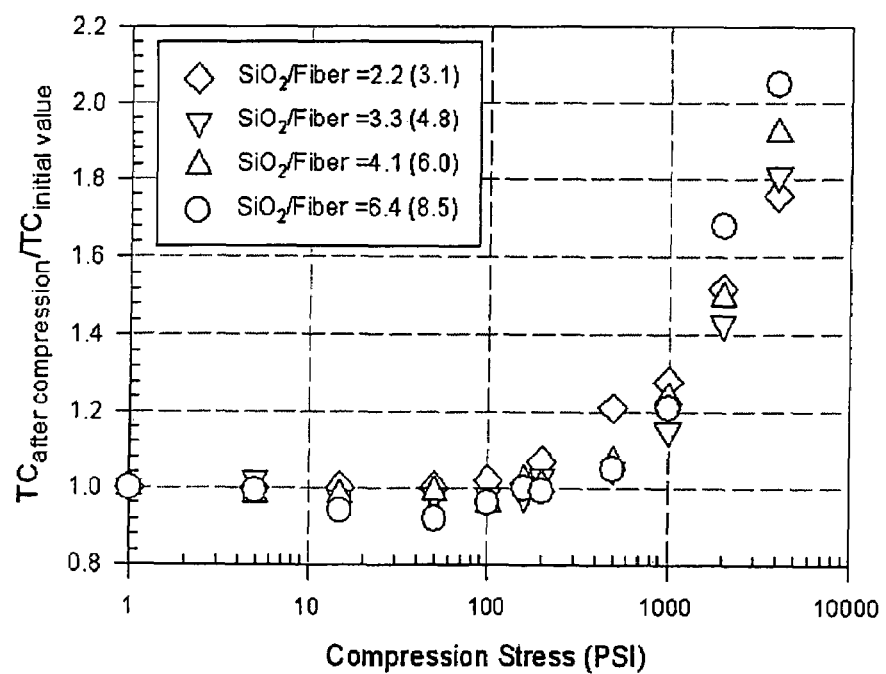
FIG. 9 is a graph of the thermal conductivity data for various fiber-reinforced silica aerogels versus the compression stress applied to the composite to achieve densification. Composites with various silica/fiber theroretical (actual in parenthesis) weight ratios are displayed.

Subsequent to mechanical densification, the pore size distribution of aerogels is typically narrowed by a significant amount. Despite such occurrence, the high surface areas of these nanoporous materials can be essentially unaffected by mechanical densification and mechanically strengthened nanoporous bodies with improved or substantially unchanged thermal conductivity (within certain compression ranges) can result as seen in FIG. 9. This is a highly important finding considering that an increase in density would be expected to result in a corresponding increase in the thermal conductivity. Also important is that to date, relatively dense, nanoporous bodies have not proven suitable for many uses due to: low flexibility, low compressive strength, low flexural strength, low durability, less than ideal thermal conductivity, low surface area (relative to lower density material of the same composition) or a combination thereof. Aerogel composite materials can be densified in a manner resulting in nanoporous bodies of high compressive strength relative to the non-densified forms. These nanoporous bodies presently described will offer significantly improved thermal insulation properties over the relatively non-compressible materials (e.g. syntactic foams). Further, combined structures can be created from a lay-up of densified materials such that they demonstrate improved compressive, flexural and tensile strength. Surprisingly, the manner in which the densification occurs can have a dramatic effect on the thermal conductivity.

Densified aerogels, especially mechanically densified aerogel composites, can be formed from flexible (non-densified) precursors. Various flexible layers, including flexible fiber-reinforced aerogels, can be readily combined and shaped to give pre-forms that when mechanically compressed along one or more axes, give compressively strong bodies along any of those axes. These densified aerogel bodies exhibit much better thermal insulation values than syntactic foams. Other composite aerogel properties benefiting from mechanical densification, includes increased flexural strength and modulus.

Figure 1:
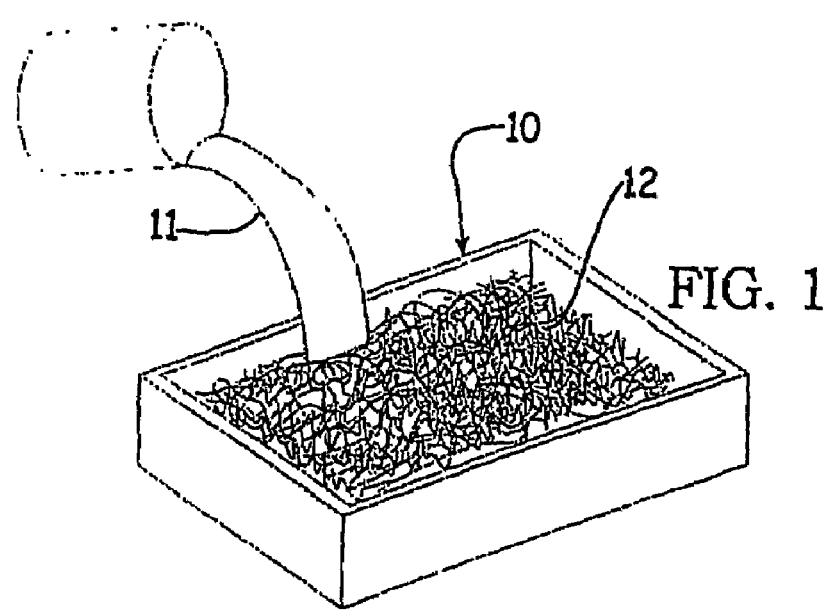
FIG. 1 illustrates a general fabrication process of the present invention.
Figure 2:
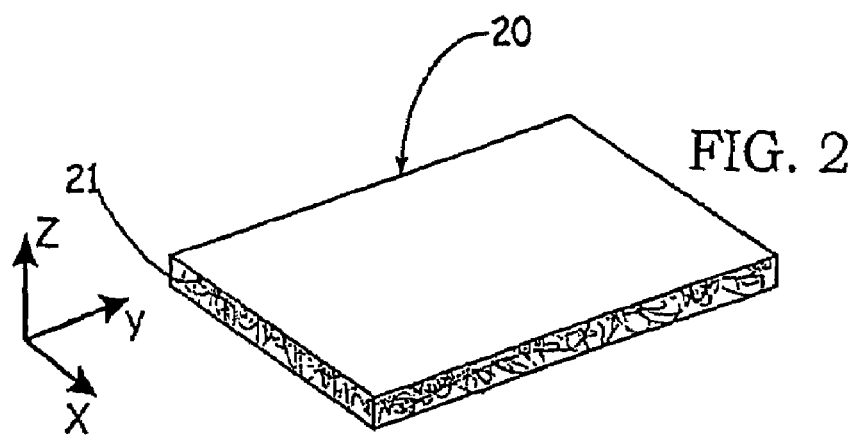
FIG. 2 is a view of an aerogel composite of the present invention.
Figure 3:
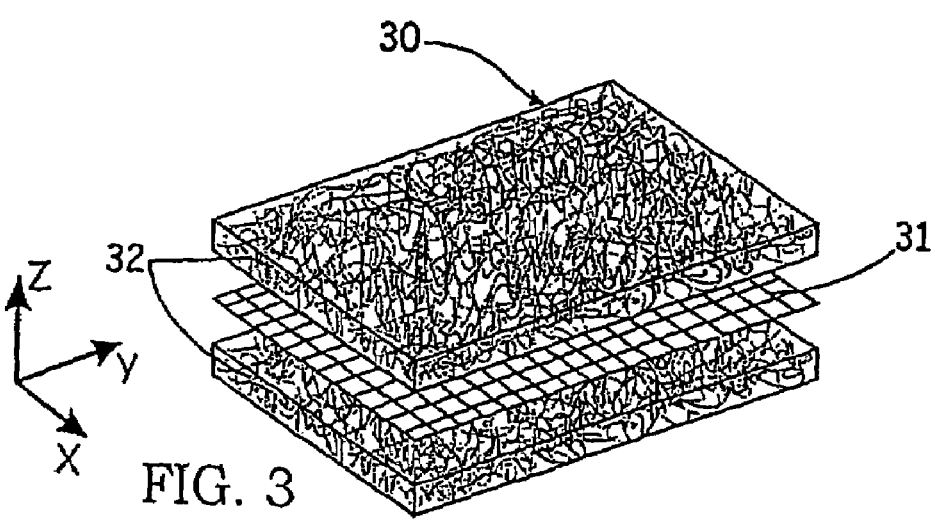
FIG. 3 is an exploded view of a 3 layer laminate useful as a reinforcement material in the present invention.

For the sake of convenience the alcogel route of forming inorganic aerogels is used below to illustrate the invention, though this is not intended to limit the present invention to any specific type of aerogel and/or method of preparation. The invention is also applicable to other inorganic-, inorganic/organic-, and organic-aerogels and preparation methods. The present invention can be seen via FIGS. 1-19. Specifically, FIGS. 1-7 illustrate the fabrication process of the aerogel materials used as precursors in the present invention; while FIGS. 12-19 illustrate the methods by which densification of aerogels and aerogel composites may be accomplished according to the present invention. FIG. 1 illustrates the fabrication process of the present invention wherein a gel precursor 11 is added to a reinforcing batting 12 in some constraining mold type structure 10. FIG. 2 shows an aerogel composite 20 of the present invention formed with an inorganic or organic batting 21 and an aerogel matrix. FIG. 3 shows a gel precursor mixed with microfiber material being cast into a continuous lofty fiber batting material to generate the composite illustrated in FIG. 4. This composite is then further dried as discussed in further detail below.

Aerogels and aerogel composites suitable for densification can take on a variety of forms including particle-reinforced, fiber-reinforced or unreinforeced aerogels, any one of which comprising an organic, inorganic or a hybrid aerogel matrix. A preferred form is a two phase aerogel composite where the first phase comprises a low-density aerogel matrix and the second comprises a reinforcing material. Preferrably this reinforcing phase consists primarily of a lofty fibrous material, such as a combination of the lofty batting and one or more fibrous materials of significantly different thickness, length, and/or aspect ratio. A preferred combination of a two fibrous material system is produced when a short, high aspect ratio microfiber (one fibrous material) dispersed throughout an aerogel matrix that penetrates a continuous lofty fiber batting (the second fibrous material). One such example is the nondensified composite aerogel body illustrated in FIG. 1.

In a simple form of fiber-reinforced aerogel composites, a fibrous material is embedded within a matrix material for a variety of reasons, such as improved mechanical performance. The matrix material, can be prepared via sol-gel processing, resulting in a polymeric network (comprising an inorganic, organic, or inorganic/organic hybrid) that defines a structure with very small pores (on the order of billionths of a meter). Fibrous materials added prior to the point of polymeric gelation during sol-gel processing reinforce the matrix material. The aerogel matrix of the preferred precursor materials for the present invention may be organic, inorganic, or a mixture thereof. The wet gels used to prepare the aerogels may be prepared via any of the gel-forming techniques that are well-known to those skilled in the art: examples include adjusting the pH and/or temperature of a dilute metal oxide sol to a point where gelation occurs (R. K. Iler, *Colloid Chemistry of Silica and Silicates,* 1954, chapter 6; R. K. Iler, *The Chemistry of Silica,* 1979, chapter 5, C. J. Brinker and G. W. Scherer, *Sol-Gel Science,* 1990, chapters 2 and 3, which is incorporated by reference herein). Examples of materials for forming inorganic aerogels are metal oxides such as silica alumina, titania, zirconia, hafnia, yttria, vanadia and the like. Particularly preferred are gels formed primarily from alcohol solutions of hydrolyzed silicate esters due to their ready availability and low cost.

Generally the principal synthetic route for the formation of an inorganic aerogel is the hydrolysis and condensation of an appropriate metal alkoxide. The most suitable metal alkoxides are those having about 1 to 6 carbon atoms, preferably from 1-4 carbon atoms, in each alkyl group. Specific examples of such compounds include tetraethoxysilane (TEOS), tetramethoxysilane (TMOS), tetra-n-propoxysilane, aluminum isopropoxide, aluminum sec-butoxide, cerium isopropoxide, hafnium tert-butoxide, magnesium aluminum isopropoxide, yttrium isopropoxide, titanium isopropoxide, zirconium isopropoxide, and the like. In the case of silica precursors, these materials can be partially hydrolyzed and stabilized at low pH as polymers of polysilicic acid esters such as polydiethoxysiloxane. These materials are commercially available in alcohol solution. Pre-polymerized silica precursors are also preferred for the aerogel composites described herein.

Major variables in the inorganic aerogel formation process include the type of alkoxide, solution pH, and alkoxide/alcohol/water ratio. Control of the variables can permit control of the growth and aggregation of the matrix species throughout the transition from the "sol" state to the "gel" state. While properties of the resulting aerogels are strongly affected by the pH of the precursor solution and the molar ratio of the reactants, any pH and any molar ratio that permits the formation of gels may be used in the embodiments.

Generally, the solvent for these processes is a lower alcohol, i.e. an alcohol having 1 to 6 carbon atoms, preferably 2 to 4, though other liquids can be used as is known in the art. Examples of other useful liquids include but are not limited to: ethyl acetate, ethyl acetoacetate, acetone, dichloromethane, and the like.

Alternatively, any of the following methods can be utilized to make a precursor aerogel composite article, but the methods that allow for obtaining the lowest density and/or best thermally insulating articles are preferred. For example, in a first alternative implementation of gel making, a water soluble, basic metal oxide precursor can be gelled by acidification in water to make a hydrogel. Sodium silicate has been widely used for this purpose. Salt by-products may be removed from the silicic acid precursor by ion-exchange and/or by washing subsequently formed gels with water. Removing the water from the pores of the gel can be performed via exchange with a polar organic solvent such as ethanol, methanol, or acetone. The resulting dried aerogel has a structure similar to that directly formed by supercritical extraction of gels made in the same organic solvent. A second alternative method entails reducing the damaging capillary pressure forces at the solvent/pore interface by chemical modification of the matrix materials in their wet gel state via conversion of surface hydroxyl groups to trimethylsilyl ethers (see U.S. Pat. No. 5,877,100 for example) to allow for drying of the aerogel materials at temperatures and pressures below the critical point of the solvent.

Methods of drying gels for generating aerogels or xerogels are well known. Kistler (J. Phys. Chem., 36, 1932, 52-64) describes a drying process where the gel solvent is maintained above its critical pressure and temperature. Due to the absence of any capillary forces, such supercritical drying maintains the structural integrity of the gel. U.S. Pat. No. 4,610,863 describes a process where the gel solvent is exchanged with liquid carbon dioxide and subsequently dried at conditions where carbon dioxide is in a supercritical state. Such conditions are milder than the one described by Kistler. U.S. Pat. No. 6,670,402 teaches drying via rapid solvent exchange of solvent inside wet gels using supercritical $CO_2$ by injecting supercritical, rather than liquid, $CO_2$ into an extractor that has been pre-heated and pre-pressurized to substantially supercritical conditions or above to produce aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically drying the fluid/sol-gel. U.S. Pat. No. 6,315,971 discloses processes for producing gel compositions comprising: drying a wet gel comprising gel solids and a drying agent to remove the drying agent under drying conditions sufficient to minimize shrinkage of the gel during drying. Also, U.S. Pat. No. 5,420,168 describes a process whereby Resorcinol/Formaldehyde aerogels can be manufactured using a simple air drying procedure. U.S. Pat. No. 5,565,142 describes a process where the gel surface is modified such that it is more hydrophobic and stronger so that it can resist any collapse of the structure during ambient or subcritical drying. Surface modified gels are dried at ambient pressures or at pressures below the critical point (subcritical drying). Products obtained from such ambient pressure or subcritical drying are often referred to as xerogels.

For silica aerogels containing low temperature insulation, the currently preferred ingredients are tetraethoxysilane (TEOS), water, and ethanol (EtOH). The preferred ratio of TEOS to water is about 0.2-0.5:1, the preferred ratio of TEOS to EtOH is about 0.02-0.5:1, and the preferred pH is about 2 to 9. The natural pH of a solution of the ingredients is about 5. While any acid may be used to obtain a lower pH solution, HCl, $H_2SO_4$ or HF are currently the preferred acids. To generate a higher pH, $NH_4OH$ is the preferred base.

It is also well known to those skilled in the art that organic aerogels can be made from polyacrylates, polystyrenes, polyacrylonitriles, polyurethanes, poly-imides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, agarose, and the like (see for instance C. S. Ashley, C. J. Brinker and D. M. Smith, *Journal of Non-Crystalline Solids*, volume 285, 2001).

Suitable materials for use in preparing aerogels for use at low temperatures comprise the non-refractory metal alkoxides based on oxide-forming metals. Preferred such metals are silicon and magnesium as well as mixtures thereof. For higher temperature applications, suitable alkoxides are generally refractory metal alkoxides that will form oxides, e.g. such as zirconia, yttria, hafnia, alumina, titania, ceria, and the like, as well as mixtures thereof such as zirconia and yttria. Mixtures of non-refractory metals with refractory metals, such as silicon and/or magnesium with aluminum, may also be used. An advantage of using more than one metal oxide matrix material for the aerogel structure is an enhancement of IR opacification, achieved by providing chemical functional groups that absorb radiation at a wider range of wavelengths. Furthermore, finely dispersed dopants, such as carbon black, titania, iron oxides, silicon carbide, molybdenum silicide, manganese oxides, polydialkylsiloxanes wherein the alkyl groups contain 1 to 4 carbon atoms, and the like, may be added to improve thermal performance at higher temperatures by increasing the opacity of the article to IR transmission. Suitable amounts of such dopants generally range from about 1 to 40% by weight of the finished composite, preferably about 2 to 10%.

In the aforementioned fiber-reinforced aerogel composites, the preferred fiber reinforcement is a lofty fibrous structure (batting or web), but may also include individual randomly oriented short microfibers, and woven or non-woven fibers. More particularly, preferred fiber reinforcements are based upon either organic (e.g. thermoplastic polyester, high strength carbon, aramid, high strength oriented polyethylene, etc.), low-temperature inorganic (e.g. metal oxide glasses such as E-glass), or refractory (e.g. silica, alumina, aluminum phosphate, aluminosilicate, etc.) fibers.

If a nanoporous body is reinforced with strong fibers oriented with their major axis along the direction of tensile stress, then that body can also have significantly improved tensile strength relative to nanoporous bodies not reinforced by fiber. U.S. Pat. No. 6,068,882 (Ryu) discloses an example of a non-mechanically densified aerogel composite material that can be mechanically densified according to embodiments presented herein. U.S. Pat. No. 5,306,555 (Ramamurthi et al.) discloses an aerogel composite comprising a bulk aerogel matrix with fibers dispersed therein and a method for preparing the aerogel matrix composite. Such reinforced aerogel composites are preferred for various embodiments of the present invention although non-fiber reinforced aerogels (or aerogel composites) are also employable. Especially preferred aerogel composites used in the mechanical densification process are those like Cryogel®, Pyrogel®, or Spaceloft® sold commercially by Aspen Aerogels, Incorporated. Fiber-reinforced low-density aerogel composites are available commercially from Aspen Aerogels Incorporated under trade names such as Cryogel®, Pyrogel®, and Spaceloft™, and are preferred for use in creating the densified nanoporous bodies presently described. Low density aerogels are a preferred form for use with the present embodiments and can be made by conventional sol-gel processing techniques known to those skilled in the art. The densification methodology described presently is applicable to all other aerogels and their preparation methods.

While the same fibrous material may be used in both the batting and the tensile strengthening fibers, a combination of different materials may be utilized. One such combination is a lofty fiberglass batting with high tensile strength carbon cloth distributed in the top, bottom or interstitial layer regions. In an embodiment of this invention, the lofty reinforcing fibrous batting is used in the form of a multi-layer laminate as shown in FIG. 3. In addition to including fibrous material batting, the laminates may include layers of materials that will help provide specific characteristics to the final composite structure. For example, the inclusion of a cloth or orthogonally oriented set of unidirectional fiberous layers in the x-y plane, such as a Kevlar® or Spectra®, can improve x-y tensile strength in addition to significantly toughening the material to penetration through the z-axis, such as in a ballistics protection application. The aerogel layer absorbs energy by crushing whereas the tensile fiber layer absorbs energy by stretching. The synergistic effects of the lay-up are an example of benefits of this embodiment. The strong fiber layers also provide ability to anchor the composite to a support structure, and/or provide additional physical strength.

Mechanical loads experienced by a composite aerogel can be transmitted through a tough cloth fabric layer to a fastener and into other structures. The mechanical load can be initially experienced by the fabric layer and thereafter transferred onto the aerogel composite. An example of this would be fastening the aerogel composite onto a vehicle chassis to serve as a heat barrier. The process for creating the densified nanoporous bodies of this embodiment does not require that densification occur prior to installation in an application environment. Via a securing means (adhesives, tapes, fasteners, etc.) the non-mechanically densified aerogel composite can be secured to a body followed by hydrostatic compression which molds the now mechanically densified nanoporous body to the shape of the article. This is a significant advantage for creating insulated or protected articles in the lowest possible volume or cross-sectional area.

In the aforementioned embodiments a "substantial increase" in density can be defined in a broad fashion as a measurable increase in density and in a narrow fashion as $\rho_{after\ compression}/\rho_{before\ compression}$ where this ratio is between about 1.01 and about 10, more preferably between about 1.01 and about 5 and most preferably between about 1.01 and about 2.

In another embodiment, the densification can also be measured by the compressive forces.

A way of understanding the need for openness in the fiber reinforcing material used herein is to recognize that fiber reinforcements that tend to run along the z axis, (in the direction of the heat flow) will significantly increase the thermal conductivity of the resulting composite by acting as thermal conduits. A batting that has highly aligned (straight) fibers, particularly in the x-y horizontal plane is stiffer than a typical lofty batting of the same density with bent or crimped fibers running in all three axes. In order to minimize heat flow in the z direction (as is the desire with most insulating materials) the batting should have low heat flow along the z axis (in the direction of the heat flow). Thus a suitable batting has a high enough quantity of fibers oriented along the z axis to maintain loft, yet not so great a quantity that the insulating properties of the resulting composite are compromised by these fibers. The fibers along the z axis may be of a different material (preferably one with lower thermal conductivity) than those in the x and y axes. The z axis fibers may also be made more circuitous, so that they present a more tortuous path for heat conduction than do the fibers in the x-y direction. The same fiber materials and methods may be used throughout the batting in an attempt to minimize thermal conduction in all axes, but in many insulating applications, however, it is heat flow in a specific direction that is being addressed, and using such materials and methods may compromise the flexibility of the resulting composite. The ideal lofty batting is one with fine, crimped fibers, evenly dispersed throughout the composite.

While the composite produced with a lofty batting is flexible, durable, has a low thermal conductivity and has a good resistance to sintering, the performance of the aerogel composite may be substantially enhanced by incorporating randomly distributer microfibers into the composite, particularly microfibers that will help resist sintering while increasing durability and decreasing dusting. The effect of short fiber reinforcement (microfiber) on the performance of a composite will depend on a number of variables, such as fiber alignment, diameter, length, aspect ratio (fiber length/fiber diameter), strength, modulus, strain to failure, coefficient of thermal expansion, and the strength of the interface between the fiber and the matrix. The microfibers are incorporated into the composite by dispersing them in the gel precursor liquid and then using that liquid to infiltrate the lofty batting.

Suitable microfibers useful herein typically range from 0.1 to 100 μm in diameter, have high aspect ratios (L/d>5, preferably L/d>100), and are relatively uniformly distributed throughout the composite. Since higher aspect ratios improve composite performance, the longest microfibers possible are desired. However, the length of the fibers used herein is constrained to avoid (or at least minimize) any filtration by the chosen lofty batting has when a microfiber-containing gel precursor is infused into the batting. The microfibers should be short enough to minimize filtration by the lofty batting and long enough to have the maximum possible effect on the thermal and mechanical performance of the resulting composite. The microfibers preferably have a thermal conductivity of 200 mW/m-K or less to facilitate the formation of low thermal conductivity aerogel composites.

When the microfibers are dispersed in a sol, they often will rapidly settle. To overcome this problem, a suspension or dispersion agent that will not deleteriously effect the gel formation should be added to the sol. Suitable suspension/dispersion agents include solutions of high molecular weight block copolymers with pigment affinic groups (Disperbyk-184 and 192 from BYK-Chemie), and the like. The agents need to be effective during at least the period of time between the dispersion of the microfiber in the gel precursor and the gelation of the sol.

The quantity, type, and/or size and aspect ratio of the microfibers used within a specific aerogel composite may be varied to meet specific tasks. For example, an application may involve insulating regions of different temperatures using a continuous aerogel composite; the composite may be made such that more microfibers will be present in the areas of the composite that will contact the higher temperature regions. Similarly, different microfibers (e.g. different material, different aspect ratio, size) may be incorporated in such areas for best insulation performance. Such microfiber modification may be accomplished by using a variety of suspension agents and/or microfibers to cause the microfibers to settle into the composite at different rates and thus in different locations.

While the same fibrous material may be used in both the batting and the microfibers, a combination of different materials may be utilized. One such combination is a lofty fiberglass batting with carbon microfibers distributed throughout.

Figure 5:
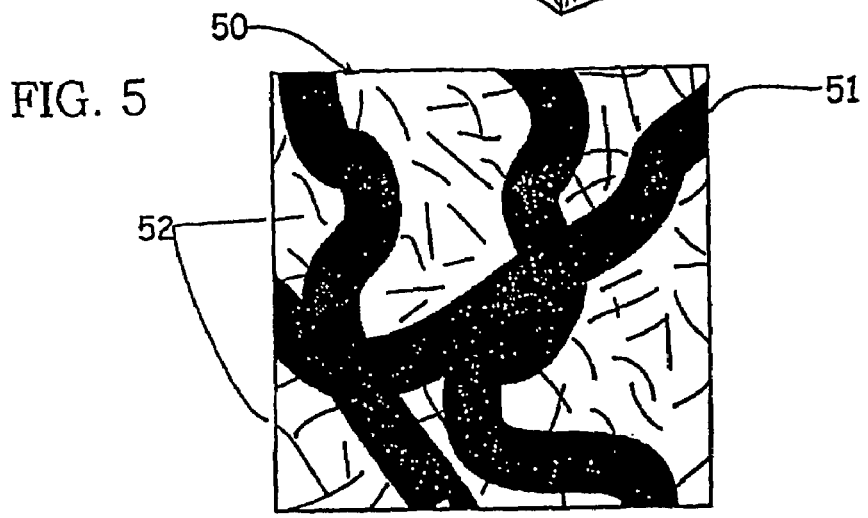
FIG. 5 is an exploded partial view of an aerogel composite showing the composite reinforced both on a macro level with a fiber batting and on a micro level with individual filaments.

As indicated the combination of batting and microfiber reinforcement has been found to enhance sintering resistance. This may be accomplished by incorporating microfibers of a suitable material, e.g. carbon filaments, within the gel precursor (generally in combination with a suitable non-reactive dispersing agent) prior to pouring the gel precursor onto the fibrous batting. FIG. 5 is an exploded view of such an aerogel composite where the composite is reinforced on both a macro level with a fibrous batting 51 and on a micro level with carbon fiber filaments 52. When dispersed in a silica matrix, carbon microfibers provide a combination of IR opacification and microscale strengthening that give a non-refractory metal oxide such as silica greatly improved thermal and mechanical performance at higher temperatures relative to non-strengthened and opacified silica.

Figure 4:
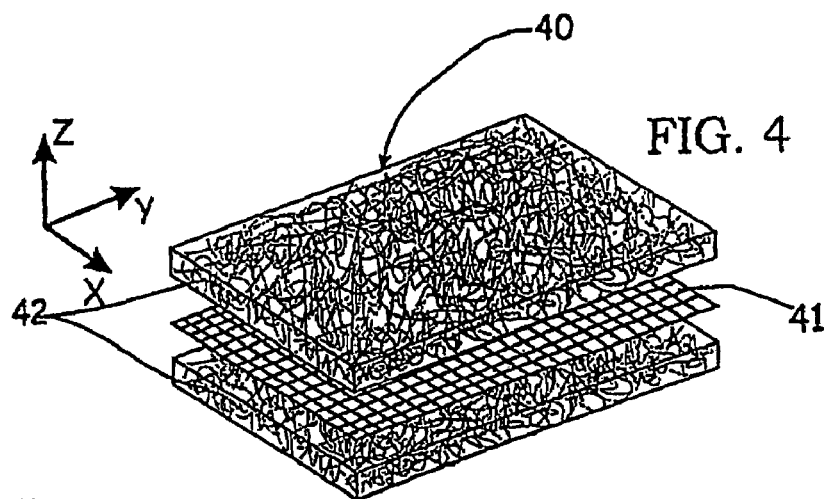
FIG. 4 is an exploded view of an alternative 3 layer laminate useful as a reinforcement material in the present invention.
Figure 6:
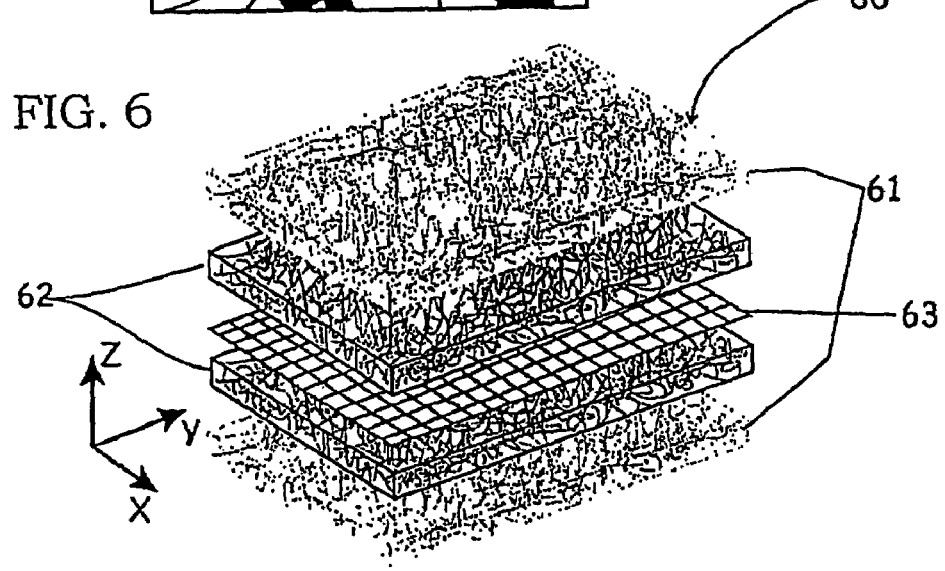
FIG. 6 is an exploded view of an alternative 5 layer laminate useful in the present invention.

In another embodiment of this invention, the lofty reinforcing fibrous batting is used in the form of a multi-layer laminate as shown in FIGS. 3, 4, and 6. In addition to including fibrous material batting, the laminates may include layers of materials which will help provide specific characteristics to the final composite structure. For example, the inclusion of a metal layer in the x-y plane, such as a copper mesh, can improve x-y thermal and/or electrical conductivity, RFI-EMI attenuation, the ability to anchor the composite to a support structure, and/or provide additional physical strength. While any metal can be used to produce the metal mesh, copper and stainless steel are currently preferred. Suitable meshes will be made from wires having diameters ranging from about 0.001 to 0.1 inches, preferably about 0.01 to 0.05, and the wire spacing may range from as tight as a window screen to 0.3 inches.

When the additional layer is of a high (>1 W/m-K) thermal conductivity material such as a carbon fiber, silicon carbide, or a metal, the resulting composite has been found to exhibit a significantly enhanced ability to rapidly dissipate heat throughout the x-y plane of a multilayer composite, further improving the durability of the composite under a high heat load.

FIG. 3 shows a 3 layer laminate consisting of a layer of lofty fiber batting 32, a fine copper mesh 31, and a second layer of lofty fiber batting 32. FIG. 4 shows another 3 layer laminate of a layer of lofty fiber batting 42, a woven carbon fiber textile 41, and a second layer of fiber batting 42. While these laminates are shown to be symmetric, this is preferred and not mandatory.

When a metal mesh is used as one or more of the central layers, it also offers the benefit of producing an aerogel composite material which is not only drapeable or flexible, but is also conformable, i.e. it can retain its shape after bending.

Other approaches to couple the high conductivity layer into the composite include metal sheet where portions of the sheet are cut and bent out of plane. These bent portions serve as an anchor between the conductive layer and the rest of the composite. Metal foil strips may be similarly utilized, as may a combination of such materials.

The conductive layer has a number of secondary benefits. Aerogel composites containing metal conductive layers, may be deformed to conform to a shape and hold that shape. The composite of FIG. 3 can be deformed to both simple and complex curvatures. It can spring back to a limited extent but also effectively plastically deformed to hold a shape. Another benefit of the conductive layer is that it commonly consists of structural fibers—strong and continuous. This conductive layer can serve as an anchoring material through which mechanical fasteners may be driven. The fasteners would grip onto composite or the conductive layer itself.

Mechanical loads experienced by the composite can be transmitted through a metal conductive layer to the fastener and into other structures. An example of this would be fastening the aerogel composite onto a vehicle chassis to serve as a heat barrier. If the reinforcement is adequately magnetized, it may be attached to a ferrous or magnetic structure without the need of mechanical fasteners. The heat transmitted by the conductive layer can be either dumped to the environment and/or a heat sink (radiation, convection) or used to run secondary processes. For example, excess heat may be used directly (heating water, etc.) or converted into electrical energy through a Peltier element or the like. The design of the aerogel composite can be such that the hot side of the blanket has a conductive layer near the surface that directs heat flux to the cold side of the blanket only at points where Peltier elements are placed. Examples of high thermal conductivity fibers include graphite, silicon carbide, copper, stainless steel, aluminum, and the like.

FIG. 6 is an exploded view of a laminate consisting of a layer of fiber batting 61, a layer of silicon carbide felt 62, a fine copper mesh 63, a layer of silicon carbide felt 62, and a layer of fiber batting 61.

After identification of the aerogel to be prepared, a suitable metal alkoxide-alcohol solution is prepared. The preparation of aerogel-forming solutions is well known in the art. See, for example, S. J. Teichner et al, Inorganic Oxide Aerogel, Advances in Colloid and Interface Science, Vol. 5, 1976, pp 245-273, and L. D. LeMay, et al., Low-Density Microcellular Materials, MRS Bulletin, Vol. 15, 1990, p 19.

While a single alkoxide-alcohol solution is generally used, a combination of two or more alkoxide-alcohol solutions may be used to fabricate mixed oxide aerogels. After formation of the alkoxide-alcohol solution, water is added to cause hydrolysis so that a metal hydroxide in a "sol" state is present. The hydrolysis reaction, using tetra-ethoxysilane as an example, is:

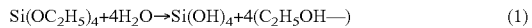

$$Si(OC_2H_5)_4 + 4H_2O \rightarrow Si(OH)_4 + 4(C_2H_5OH\text{---}) \quad (1)$$

To form an aerogel monolith, this sol state alkoxide solution is then aged for a sufficiently long period (commonly overnight) so that a condensation reaction (as shown in Eq. 2) occurs and forms precursors which after supercritical drying become aerogels.

$$Si(OH)_4 \rightarrow SiO_2 + 2H_2O \quad (2)$$

Further details and explanation of the present invention may be found in the following specific examples, which describe the manufacture of aerogel composites in accordance with the present invention and test results generated there from. All parts and percents are by weight unless otherwise specified.

In certain mechanically densified aerogel composites, incorporation of a woven layer of strong fibers (e.g. carbon fiber, glass fiber, UHMWPE fiber such as Spectra®, aramid fiber) has been found helpful in improving the tensile properties of the densified nanoporous body. For example, carbon fiber material, such as but not limited to a cloth or felt or two orthogonal plies of unidirectional carbon fiber placed at the center of a composite provide improved tensile strength in the direction of the long axis of the fibers. In addition, they provide an improved thermal break-through barrier under a high heat load, a high degree of IR opacification, and a thermally dissipative layer structure that will spread the heat out in the x-y plane of the composite. More specifically, the woven or oriented fiber reinforcing layer in the middle, through the thickness, of the aerogel composite can be selected to have a minimal effect on the thermal conductivity in the direction perpendicular to the major axis of the fiber. The tensile reinforcing fibers can be intrinsic to a single structure of the aerogel composite incorporated at the sol-gel stage, or can be placed in between layers of the non-densified aerogel composite prior to mechanically densifying.

For the purposes of this patent, a lofty batting is defined as a fibrous material that shows the properties of bulk and some resilience (with or without full bulk recovery). The preferred form is a soft web of this material. The use of a lofty batting reinforcement material minimizes the volume of unsupported aerogel while avoiding substantial degradation of the thermal performance of the aerogel. Batting preferably refers to layers or sheets of a fibrous material, commonly used for lining quilts or for stuffing or packaging or as a blanket of thermal insulation.

The batting useful herein is substantially different from a fibrous mat. A fibrous mat is a densely woven or thickly tangled mass, i.e. dense and relatively stiff fibrous structures with minimal open space between adjacent fibers, if any. While a mat generally has a density of greater than 25 lbs/ft$^3$ (0.41 g/cc), a lofty batting useful herein typically has a much lower density, i.e. in the range of about 0.1 to 16 lbs/ft$^3$ (0.001-0.26 g/cc), preferably about 2.4 to 6.1 lbs/ft$^3$ (0.04 to 0.1 g/cc). Generally, mats are compressible by less than about 20% and show little to no resilience. In an aerogel composite prepared with a mat reinforcement, the cross sectional area of the mat fibers can be up to 30 to 50% of the total cross-sectional area.

Suitable fibrous materials for forming both the lofty batting and the x-y oriented tensile strengthening layers include any fiber-forming material. Particularly suitable materials include: fiberglass, quartz, polyester (PET), polyethylene, polypropylene, polybenzimid-azole (PBI), polyphenylenebenzo-bisoxasole (PBO), polyetherether ketone (PEEK), polyarylate, polyacrylate, polytetrafluoroethylene (PTFE), poly-metaphenylene diamine (Nomex), poly-paraphenylene terephthalamide (Kevlar), ultra high molecular weight polyethylene (UHMWPE) e.g. Spectra™, novoloid resins (Kynol), polyacrylonitrile (PAN), PAN/carbon, and carbon fibers.

The mechanically densified, nanoporous bodies of the present invention are useful in a variety of insulation or physical isolation applications where compressive, flexural and possibly tensile strength are required. For example, thermal isolation washers, gaskets, or spacers that are mechanically compressed along one or more axes will reduce thermal transfer between two or more bodies. The mechanically densified bodies may also find utility in energy absorption applications, in that the present embodiments describe a process to create a variety of densified aerogel composites that are "tuned" to certain crushing characteristics to meet the expected mechanical performance needs. For instance, rapid shock and/or pressure loads exerted by explosive or ballistic impulses may be partially or completely mitigated by a controlled crushing rate of a form of the nanoporous body of the invention. Surprisingly, the resistance to further crushing of the mechanically densified nanoporous body versus a given impulse can be "pre-defined" by carefully controlling the conditions of manufacture. Whereas the crushing behavior of a relatively low-density nanoporous body may be ideal for a hyperkinetic velocity impact or blast mitigation application, relatively more densified nanoporous bodies may be ideal for absorbing energy for slower impulses (e.g. ballistics, automotive crashes, low-frequency vibrations of large amplitude).

Figure 8:
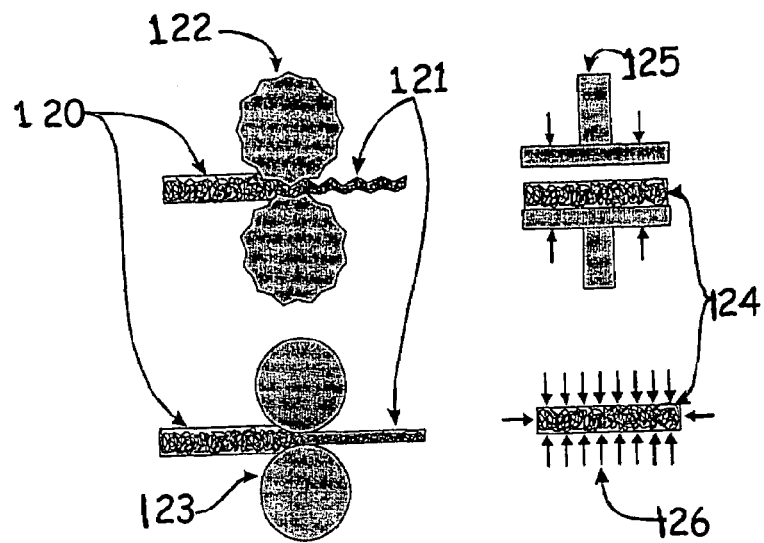
FIG. 8 illustrates general fabrication processes involving uniaxial, multi-axial and hydrostatic mechanical compression for densification of aerogel composites.

Densification according to the present invention involves uniaxial, multiaxial and/or hydrostatic compression. FIG. 8 illustrates aerogel composites 120 and 124 as they are subjected to compression via simple rollers 123, patterned rollers 122, a hydraulic press 125 or a hydrostatic compression mechanism 126.

Figure 11:
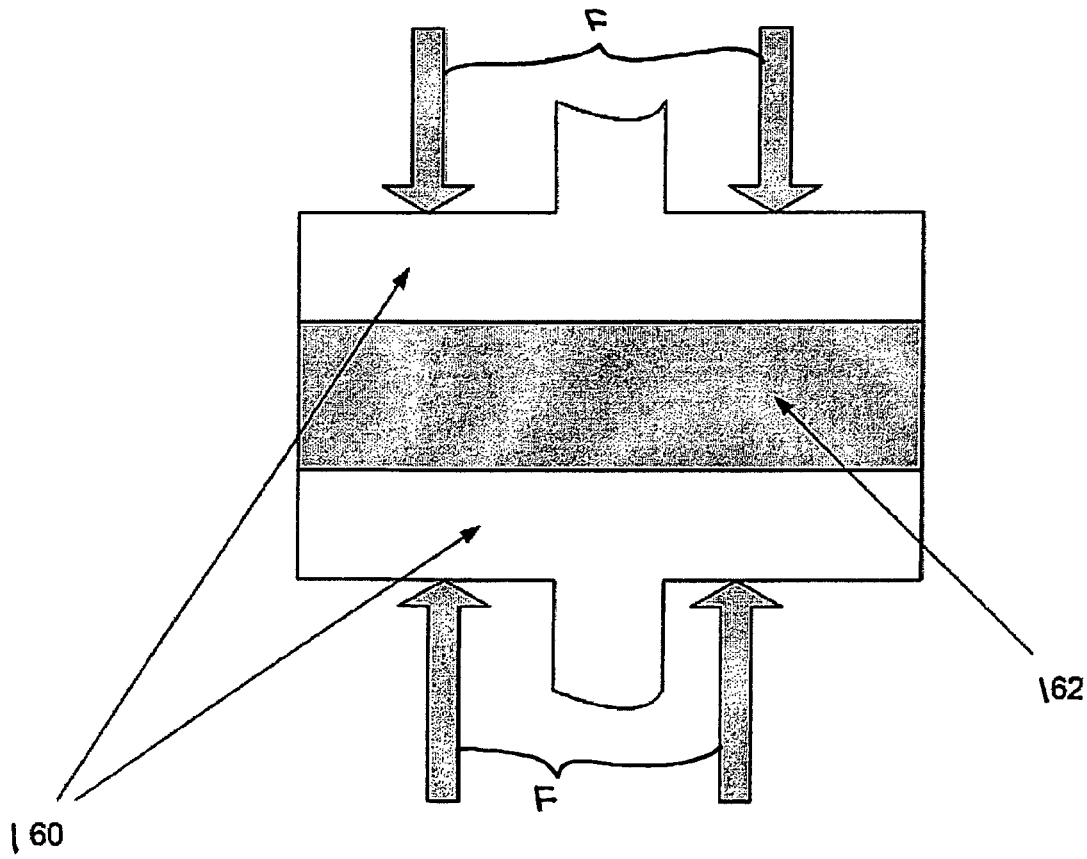
FIG. 11 illustrates a compression mechanism where a hydraulic press is used to densify an aerogel composite.

As illustrated in FIGS. 11-14 densified aerogel and aerogel composites may be formed using a hydraulic press. FIG. 11 demonstrates a typical hydraulic press having two press plates 160 in which the compression force F is applied to press plates by at least one hydraulic press cylinder unit at a location where the cylinder unit is connected to the press plate. The press plates are guided laterally and may be braked by counter support devices. Alternatively, one press plate may be fixed. Thus aerogel 162 is positioned between press plates 160 and subsequently compressed.

Figure 12:
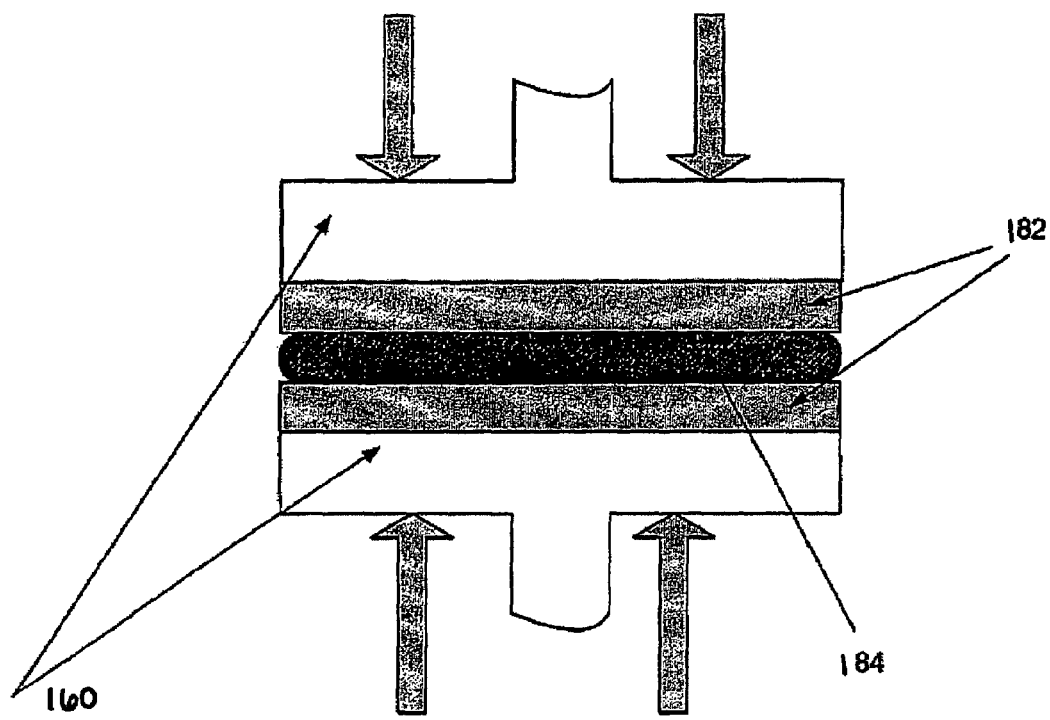
FIG. 12 illustrates a compression scheme where an intermediate layer is placed between two aerogel composites and where the hydraulic press subsequently compresses the aerogel composites onto said intermediate layer.
Figure 13:
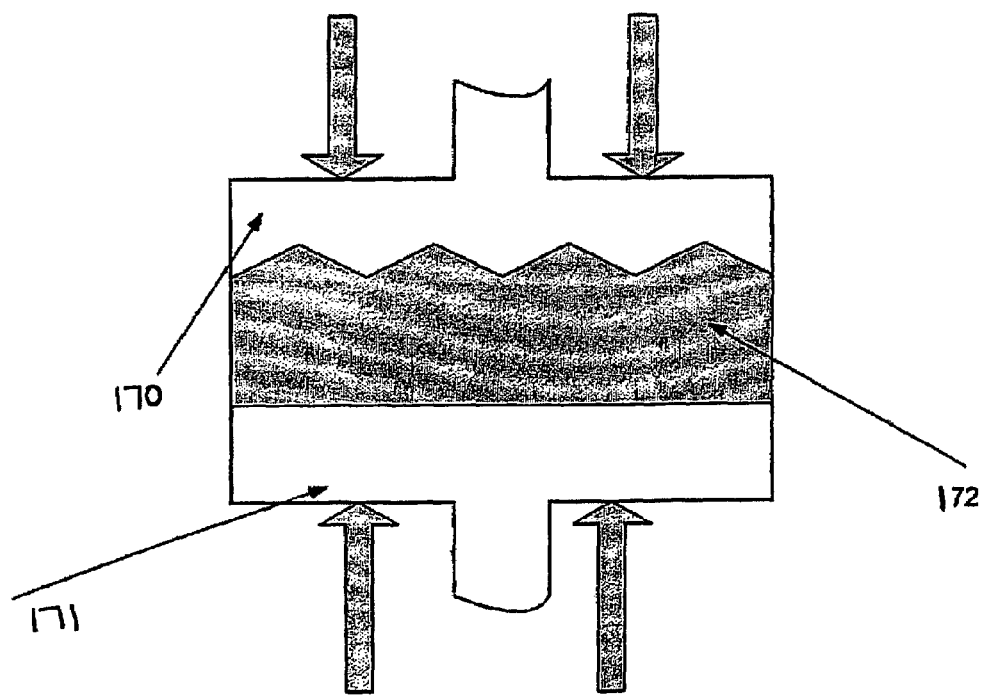
FIG. 13 illustrates a compression mechanism where a hydraulic press is used to densify an aerogel composite while simultaneously, features are imprinted thereon.
Figure 14:
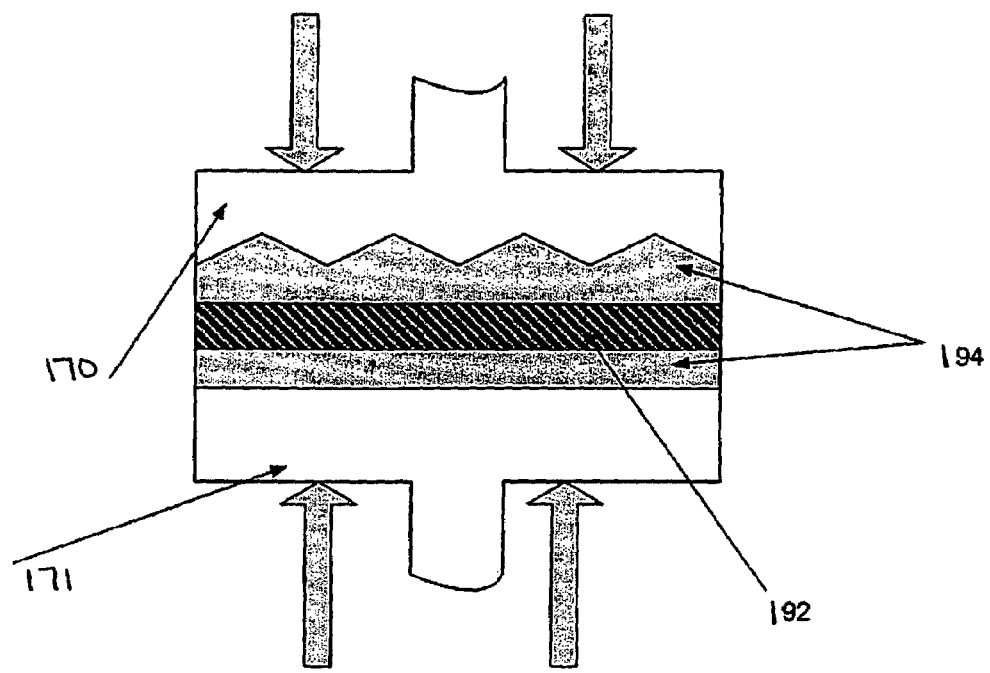
FIG. 14 illustrates a compression scheme where an intermediate layer is placed between two aerogel composites and where the hydraulic press subsequently compresses the aerogel composites onto said intermediate layer, while simultaneously surface features are imprinted onto the aerogel composite.

FIG. 12 demonstrates the densification of a composite material wherein an intermediate layer 184 is placed between two aerogel composites 182 and where press plates 160 subsequently compress the aerogel composites 182 onto the intermediate layer 184. The aerogel composite layers can be bonded mechanically to the intermediate layer, however the layers can be further adhered to one another by applying an adhesive to each layer prior to compression. Various adhesives are well known in the art and may include but are not limited to glue, adhesive strips, thermoplastic materials or combinations thereof. The present invention further contemplates imprinting features on the outer surface of the densified aerogel or densified aerogel composites. Another application may reside in deposition (e.g. metal vapor deposition) of other materials such as metals or semiconductors onto features formed on an aerogel composite. FIG. 13 illustrates the densification of an aerogel 172 wherein the surface of press plate 170 has raised features that will impart a desired texture to the surface of aerogel 172. FIG. 14 illustrates the densification of a composite material wherein an intermediate layer 192 is placed between two aerogel composites 194 and where press plates 170 and 171 subsequently compress the aerogel layer 194 onto the intermediate layer 192 while simultaneously imparting a desired texture onto one surface of the densified composite material. In an alternate embodiment, not shown, both press plates may have raised surface features so that both sides of the densified composite may be textured.

In another embodiment, densification is achieved via localized compression, provided by continuous action of counter rotating rollers having a clearance (between the rollers) substantially less than the thickness of the uncompressed composite aerogel. Accordingly, the passage of the aerogel composite through said clearance locally compresses the aerogel composite thus resulting in a substantial increase in density.

The aerogels discussed previously may also be densified by passing them between at least one pair of rollers to form sheets with reduced but more uniform thickness and a generally smoother surface. The term "densifed" refers to the process of compressing the aerogel and/or aerogel composite. In this particular embodiment compression occurs by passing the aerogel and/or aerogel composite between one or more sets of rollers in order to densify the resulting product. If a series of rollers are used, the roller pairs have successively narrower gaps between them in order to create a progressively denser aerogel and/or aerogel composite and may also have various patterns on their surfaces.

The rollers are preferably treated in order to prevent adhesion between the aerogel and/or aerogel composite and the rollers. This may be accomplished by coating the rollers with a nonstick substance, polishing the rollers, heating the rollers to form a steam barrier, cooling the rollers to form a condensation barrier or a combination of these.

In one embodiment of the present invention, as shown in FIGS. 15-19, it will be preferable to "densify" the aerogel or aerogel composite by passing it between at least one pair of rollers, the purpose of which is to improve the thermal or mechanical performance of the aerogel or aerogel composite via densification. In some embodiments, the densifying step will only densify aerogel or aerogel composite by a small amount. In other cases, the densification process will substantially densify the aerogel or aerogel composite. In cases where it is desirable to greatly densify the aerogel or aerogel composite, it will often be necessary to densify the aerogel or aerogel composite in steps, wherein the aerogel or aerogel composite is passed through several pairs of rollers each pair having progressively narrower gap distances therebetween.

Figure 15:
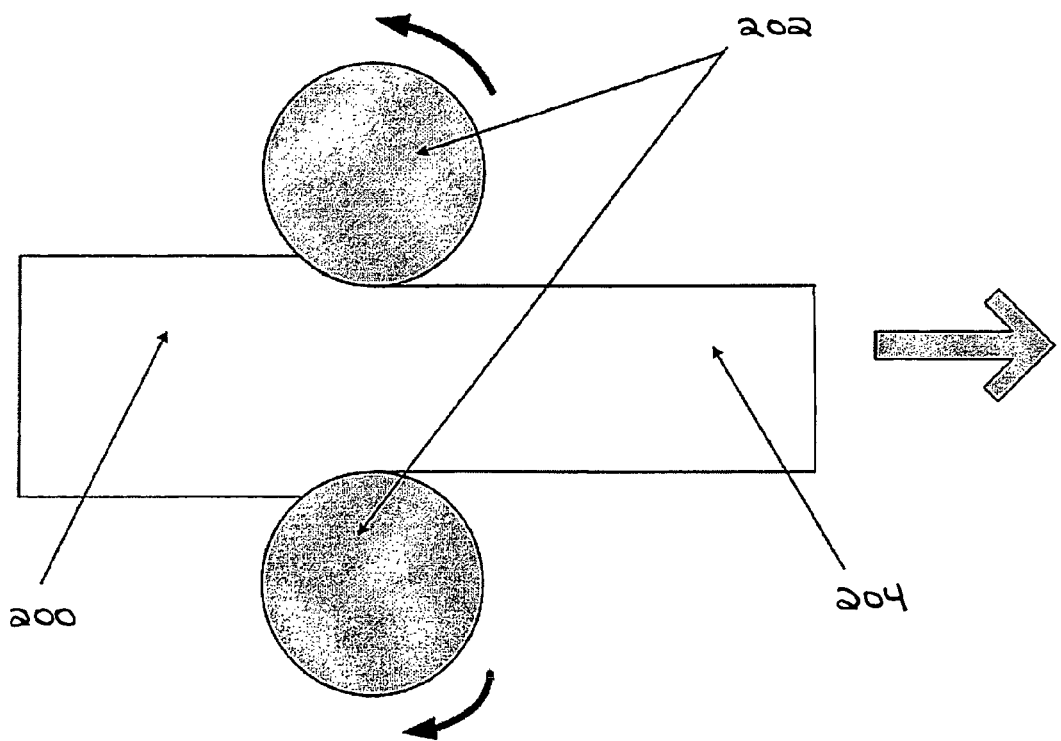
FIG. 15 is a continuous compression scheme for densification of an aerogel composite.

Reference should be made to FIG. 15 which shows one embodiment of the present invention in which at least one pair of rollers 202 are employed during the densification step. It should be understood that more than one pair of rollers may be necessary to achieve the desired densification. When more than one pair of rollers are employed the rollers within each of the roller pairs may have similar diameters, although in some cases it may be preferable to use smaller diameter rollers in combination with larger diameter rollers. As seen in FIG. 15, a set or pair of rollers normally includes two individual rollers 202 positioned adjacent to one another with a predetermined gap distance there between. The gap distance between the two individual rollers corresponds to the desired densification 204 of the aerogel 200 after it passes between the set of rollers.

Figure 17:
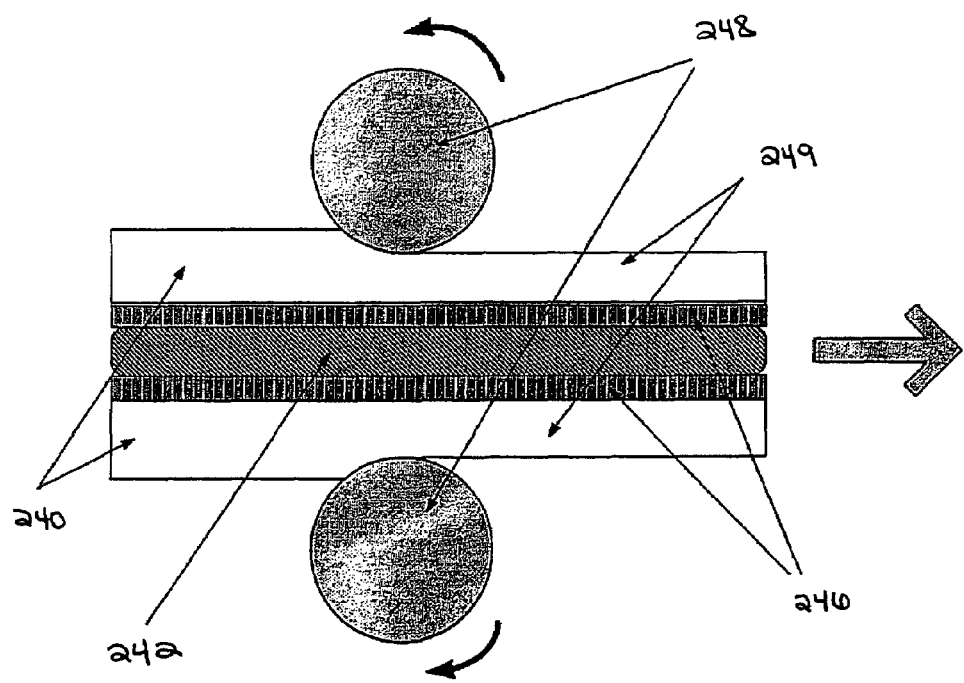
FIG. 17 is a continuous compression scheme for densification of an aerogel composite with multiple inner plies.

Aerogel composites may be formed by optionally sandwiching intermediate layers together between aerogels to create an aerogel composite. The densified aerogel can then be used to produce a composite as shown in FIG. 17. Densified aerogel 240 can sandwich a set of sub-intermediate layers 246, such as but not limited to, polymeric films, conductive films, and radiation reflecting films that in turn sandwich an inner intermediate layer 242. The multi-plied configuration is then guided between counter rotating rollers 248 resulting in compressed aerogel composites 249. It may be necessary to glue the corresponding sheets together using adhesion means known in the art. These include glue, adhesive strips, thermoplastic materials, or a combination thereof.

Figure 16:
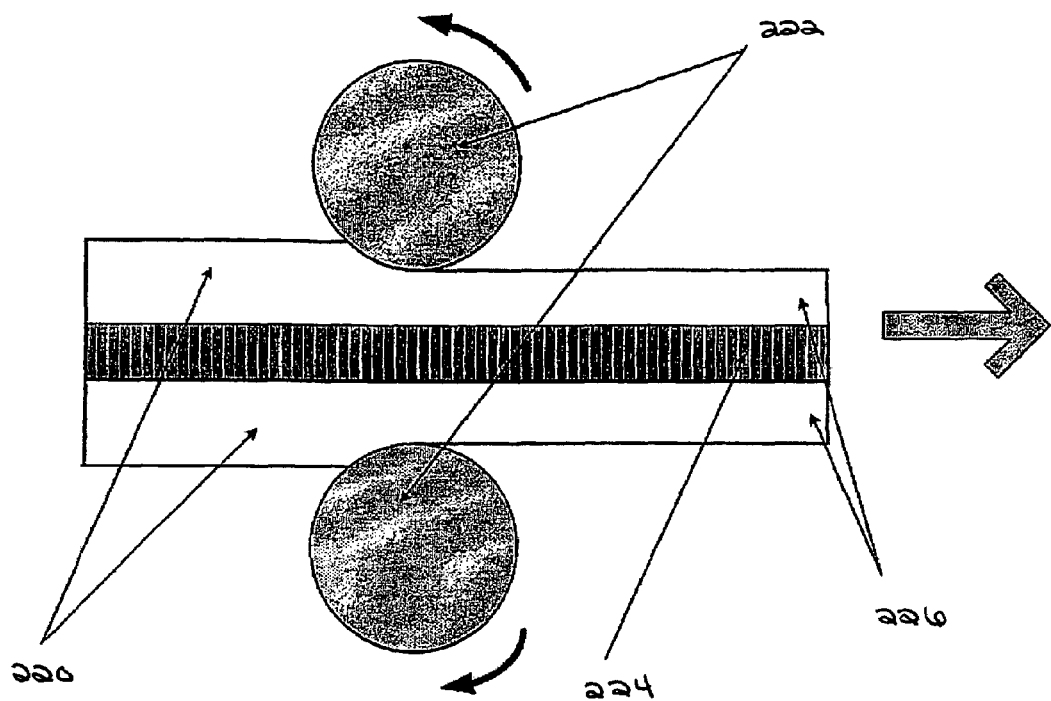
FIG. 16 is a continuous compression scheme for densification of an aerogel composite.

In some cases it may be desirous to impart a imprint or some type of raised design onto the aerogel or aerogel composite. FIGS. 16 and 17 demonstrate the manner in which this may be accomplished. Rollers 212, shown in FIG. 18 may be patterned or have some type of relief design that is desired to be imprinted onto the surface of an aerogel 210 or aerogel composite (232, shown in FIG. 19). In some cases, one or more of the sandwiched aerogels or intermediate layers may have been first imprinted by passing the aerogels or intermediate layers through a set of rollers having the desired design.

The aerogel and/or aerogel composites can be coated with a two dimensional print such that the topography of the aerogel and/or aerogel composites is not altered. The can be applied using means known in the art of paper, plastic, or polystyrene use. This can be done at any appropriate stage of the manufacturing process, including the densification stage.

This process of compressing or densifying the aerogel or aerogel composite, creates a certain amount of shearing forces on the aerogel or aerogel composite. The application of an excessively large shearing force can disrupt the integrity of the structural matrix of the aerogel or aerogel composite and create flaws within the aerogel or aerogel composite, thereby weakening the aerogel or aerogel composite. Because of this, the density of the aerogel or aerogel composite should be reduced in steps small enough to prevent undue damage to the aerogel or aerogel composite. In light of typical production parameters (such as, e.g., minimizing the number of densification steps) the densification of an aerogel or aerogel composite will preferably not exceed about 75% reduction in density during any single densification step (i.e., while passing between any one set of rollers), more preferably no greater than about 50% reduction in density, and most preferably no greater than about 30% reduction in density.

The diameter of each of the rollers and the clearances therebetween should be optimized depending on the properties of the aerogel or aerogel composite and the amount of densification of the aerogel or aerogel composite. When optimizing the diameter of the rollers two competing interests should be considered. The first relates to the fact that smaller diameter rollers tend to impart a greater amount of shearing force into the aerogel or aerogel composite as it passes between the rollers. This is because the downward angle of compression onto the aerogel or aerogel composite is on average greater than when using a larger diameter roller.

Furthermore, not only is the downward angle of compression less severe in a larger diameter roller, the distance (and by analogy, the time) during which the sheet is being accelerated is greater when using larger diameter rollers. Because it takes longer for the sheet to pass from point "a" to point "b" when using broader rollers, the rate of acceleration is decreased, as are the shearing forces associated with the densification of the aerogel or aerogel composite. Consequently, from this perspective, larger diameter rollers appear to be advantageous compared to smaller diameter rollers because less shearing forces would be expected to introduce fewer flaws into the aerogel or aerogel composite.

The use of larger diameter rollers has the further advantage of the aerogel or aerogel composite coming into contact with the roller for a greater period of time, thereby resulting in an increase in imparting designs onto the surface of the aerogel or aerogel composite.

Figure 18:
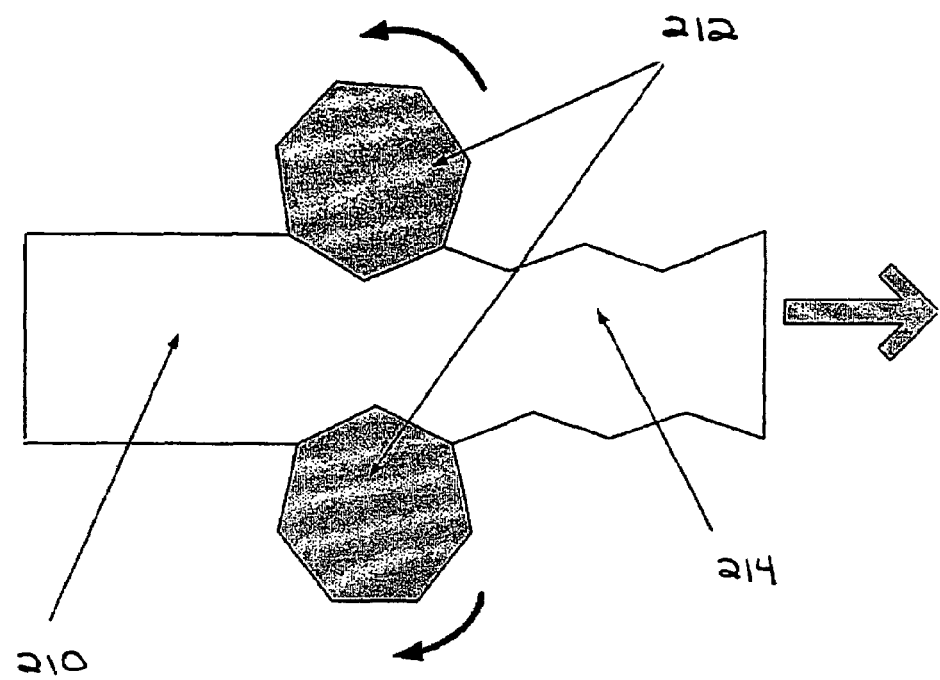
FIG. 18 is a continuous compression scheme for densification and imprinting of an aerogel.
Figure 19:
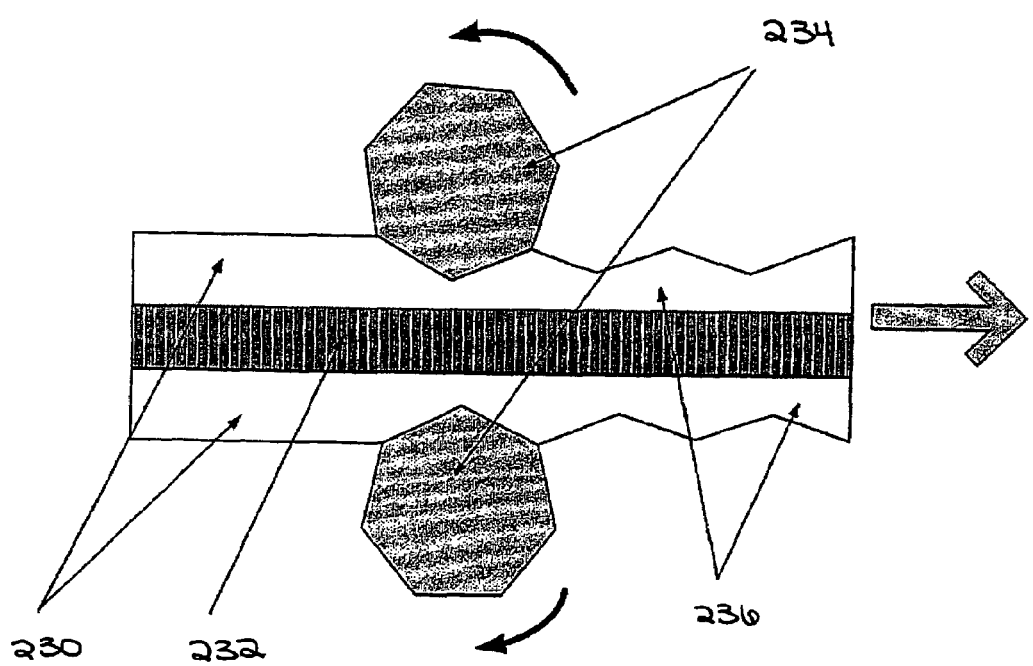
FIG. 19 is a continuous compression scheme for densification and imprinting of an aerogel composite.

In a special embodiment, said rollers are modified with desired features, that when engaging the aerogel composite, are printed thereto. This allows for texturizing and/or introducing various desired topographical features onto an aerogel composite. One example is a grooved roller (or set of rollers) that transfer a periodic high/low density cross-section into the aerogel composite (FIG. 18-19). The resulting aerogel composite is much more flexible due to a geometric structure accommodating for larger bending moments while reducing the associated compressive loads.

Figure 10:
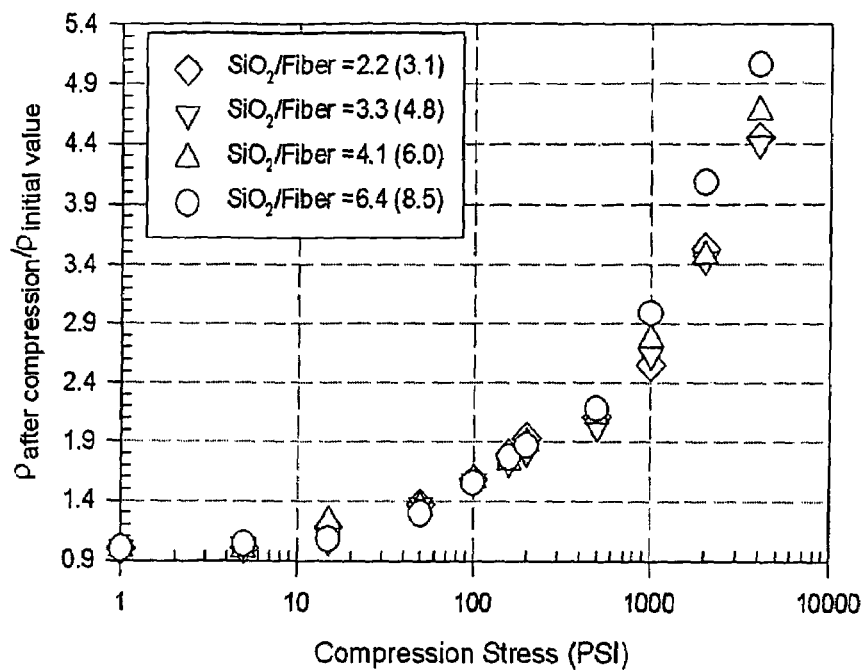
FIG. 10 is a graph of the density ratio ($\rho_{post-compression}/\rho_{pre-compression}$) of four aerogel composites with various silica/fiber theroretical (actual in parenthesis) weight ratios versus compression stress.

The thermal conductivity data for various fiber-reinforced silica aerogels versus the compression stress applied to the composite to achieve densification is shown in FIG. 9. Composites with various silica/fiber theroretical (actual in parenthesis) weight ratios are displayed. The density ratio ($\rho_{post-compression}/\rho_{pre-compression}$) of four aerogel composites with various silica/fiber theroretical (actual in parenthesis) weight ratios versus compression stress is shown in FIG. 10.

The invention is further illustrated by the following non-limiting examples. All scientific and technical terms have the meanings as understood by one with ordinary skill in the art. The specific examples which follow illustrate the methods in which the compositions of the present invention may be prepared and are not to be construed as limiting the invention in sphere or scope. The methods may be adapted to variation in order to produce compositions embraced by this invention but not specifically disclosed. Further, variations of the methods to produce the same compositions in somewhat different fashion will be evident to one skilled in the art.

EXAMPLES

Example 1

A section (2'×3'×¼') of polyester Thinsulate®. Lite Loft insulation from 3M Company was placed in a walled container. 1300 ml of a commercially available pre-hydrolyzed silica precursor is mixed with 1700 ml of denatured alcohol, 95%. The solution is stirred for 15 minutes. The solution is then gelled by the slow addition of HF (2% by volume of the total solution) with stirring. The resulting solution is poured on the blanket previously placed in a container. Gelation occurs within a few minutes. The fresh "blanket-gel" is aged overnight in a sealed bath of ethanol at 50° C. The alcohol trapped in the gel is removed by subcritical and supercritical $CO_2$ extraction over the span of four days.

The resulting aerogel composite has a density of approximately 0.1 g/cc. The thermal conductivity of the aerogel composite was determined by a Thin Heater Thermal Conductivity Test (ASTM C 1114-98) to be 16.6 mW/m-K. A pure aerogel monolith prepared using the same source materials and manufacturing process had a thermal conductivity of 17.4 mW/m-K.

The aerogel composite is extremely flexible. It can be draped over a person's arm without macroscopic failure. This "drape test" is the equivalent of approximately a 2" radius of curvature, 180° bend.

The blanket shows a significant resistance to heat transfer and thermal degradation/sintering when subjected to propane, a combination of liquefied petroleum and methylacetylene-propadiene (MAPP) gas, and oxyacetylene torch flames. If the blanket is subjected to the heat from the flame on one side, the other side can be touched by bare skin without damage. The poly-ester batting alone degrades rapidly when exposed to direct flame. The polyester batting reinforced aerogel composite resists thermal degradation of the polyester to a much greater degree (instantaneous vs. approximately 40 seconds for burn-through for a ¼" thick sample subjected to a propane torch flame). As long as the polyester remains in the aerogel matrix, the composite remains flexible and has a low degree of thermal conductivity. Burn-through will occur if the flame is placed too close to the aerogel composite.

Example 2

The procedure of Example 1 is repeated except that the polyester fiber batting was replaced by a lofty silica fiber structure (Quartzel from Saint-Gobain Quartz) having a density of 65 g/m2 with a polyvinylalcohol binder.

The resulting silica batting/silica aerogel composite has a thermal conductivity of 15.0 mW/m-K as tested on a guarded hotplate (ASTM C-177). The flexibility of the composite is less than that of the aerogel-polyester blanket of Example 1, but still significant. It is quite flexible but does not drape to the same extent. The density of the aerogel composite was 0.113 g/cc. The thickness of the composite was approximately 3 mm. This composite resists thermal degradation when exposed to open flame much better than the product of Example 1.

Aerogel sintering appears to be minimized by the presence of the fiber. An oxyacetylene torch is placed 5-6" below the sample with the top of the flame impinging on the bottom of the blanket. Minimal sintering is seen on the bottom surface of the sample after 5 hours of exposure. The top of the sample could be touched with a bare hand during the test. The temperature on the top of the aerogel composite varies from 150-230° C. based upon the distance between the blanket and the flame source. The bottom of the blanket glows orange-yellow. A single pyrometer reading taken from the yellow section of the blanket bottom yields a temperature of 1100° C.

Example 3

The procedure of Examples 1 and 2 is repeated except that the reinforcement fiber batting is replaced by a 5 layer fiber laminate of polyester/silicon carbide/−16 copper mesh/silicon carbide/polyester).

The thermal conductivity (tested per ASTM C-177) is 12.5 mW/m-K (average). The composite is not very flexible. The thickness of the laminate is 10.3 mm. The copper mesh improves the x-y thermal conductivity by spreading out point loads over a larger area. The copper mesh also provides an EMI-RFI shield. Aerogel sintering appears to be minimized by the presence of the reinforcing polyester and silicon carbide fibers.

Example 4

The procedure of Example 3 is repeated except that the reinforcement consists of a 4 layer laminate of polyester batting, uni-directional carbon fiber with a polymeric binder, light copper mesh, and a lofty polyester batting.

The thermal conductivity (tested per ASTM C-177) is 14.1 mW/m-K (average). The composite has little flexibility. The thickness of the laminate is 8.0 mm. Aerogel sintering is minimized by the presence of the reinforcing fibers.

Example 5

The procedure of Example 3 is repeated except that the reinforcement consists of a 3 layer laminate of silica felt, stainless steel mesh, and silica felt, about 6" on a side. A second reinforced aerogel composite where a copper mesh is substituted for the stainless steel is also prepared.

The thermal conductivity (tested per ASTM C-177) is 12.4 mW/m-K (average). The composite is somewhat flexible and is conformable in that it retains the shape into which it is bent. The thickness of the laminate is 5.3 mm. Aerogel sintering appears to be minimized by the presence of the reinforcing fibers in a flame test using an oxyacetylene torch set at a 6" distance from the bottom of the composite and giving approximately a 2 inch diameter impingement area (glowing red-orange). The temperature is 120° C. at the edge of the composite (thermocouple attached to the steel mesh through the top), while more than two inches away from the center of the impingement (though still directly over the flame) the temperature measures 60° C. at steady state conditions.

The aerogel composite with the copper mesh substituted for the stainless steel mesh shows the same effect.

Example 6

The procedure of Example 2 is repeated except that two additional ingredients are added to the silica sol. The first is a low denier carbon fiber (Pyrograf III, Grade PR-11-AG from Pyrograf Products, Zenia, Ohio. The second is a dispersion agent (Disperbyk 184 from BYK-Chemie). Two grams of carbon fiber and six grams of dispersion agent are added to 750 ml of ethanol in a 1000 ml beaker. The beaker is placed in an ice bath and sonicated at full power by a Misonix 2020 sonicator for one hour to break up fiber clumps and form a suspension that is visibly stable for at least an hour. When a drop of the suspension is placed on a glass slide and allowed to sheet the fibers do not rapidly clump.

The resulting silica batting/carbon fiber/silica aerogel composite has a thermal conductivity of 14.8 mW/m-K (ASTM C-177). The flexibility of the composite is slightly less than that of the aerogel blanket of Example 2 (Blanket #2), but still significant. The aerogel matrix tends to crack in a macroscopic fashion when strained. The density of the aerogel composite is approximately 0.12 g/cc. The thickness of the composite is approximately 3 mm.

This composite material resists thermal degradation when exposed to open flame much better than the aerogel blanket of Example 2.

A MAPP gas torch is used as the flame source. The torch, when applied to the quartz batting alone, would pucker and finally melt the batting. The MAPP gas torch is used to similar effect with Blanket #2. If the torch nozzle is placed close to Blanket #2, eventual degradation/sintering and burn-through occurs. The short carbon fiber augmented aerogel batting of this Example shows no degradation other than on the very bottom surface. It can not be burned through using the MAPP gas torch. The top of the sample can be touched with a bare hand during the test. The bottom of the blanket glows orange-yellow-white depending on how far away the torch is placed. Aerogel sintering appears minimal. The combination of macro and micro fiber reinforcement works far better than the macro fiber reinforcement alone.

Example 7

Figure 7:
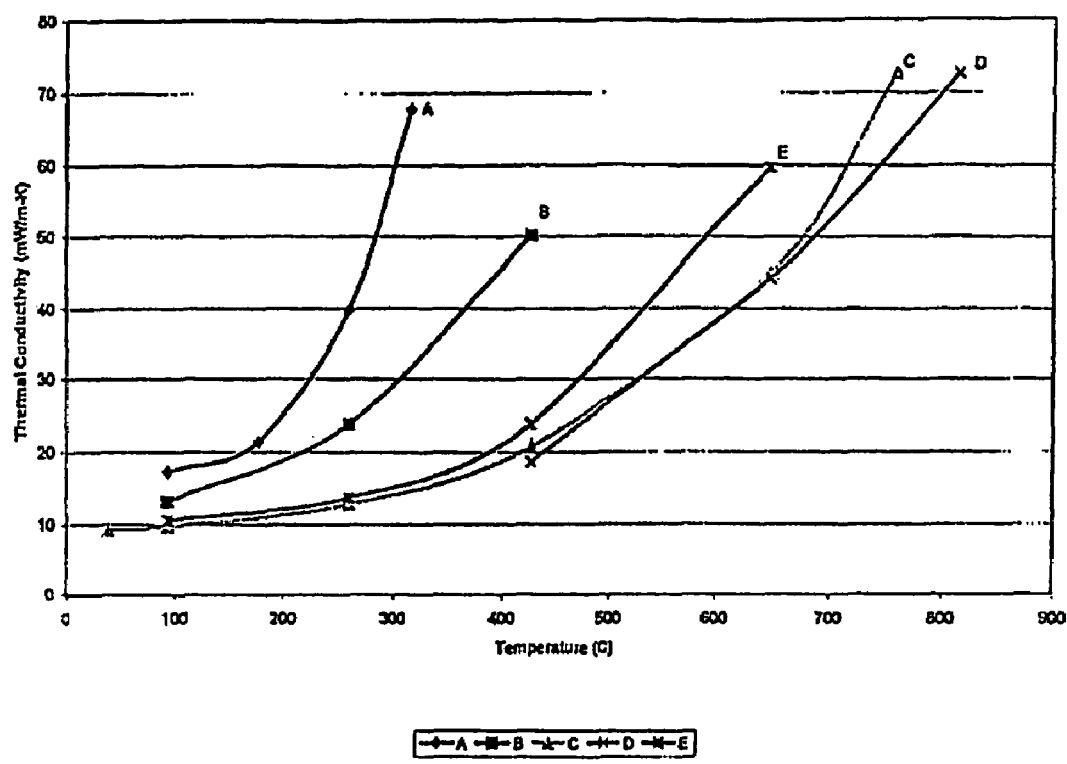
FIG. 7 is a graph of the thermal conductivity of five manufactured aerogel composites of this invention through a range of temperatures.

To evaluate the effects of various reinforcing systems on aerogel composites of one or more embodiments of the present invention, a series of composites was prepared in accordance with the procedure of Example 1 but varying the reinforcements. The aerogel composites are prepared by infiltrating a lofty reinforcement with an appropriate sol followed by supercritical drying. FIG. 7 shows the results of thermal performance vs. temperature for the following samples:

Sample A used a less than 2 denier lofty polyester batting where the cross-sectional area of fibers was less than 15% of the total cross-sectional area of the aerogel composite, and where after compression the lofty batting returned to 75% of its original thickness.

Sample B used quartz wool prepared from 9 μm fibers, with a batting density of 0.005 g/cc, and where after compression the lofty batting returned to 75% of its original thickness.

Sample C used the batting of Sample B, in combination with 5% by weight based upon the total weight of the dried composite carbon black dopant and 3% (same basis) carbon microfiber. The carbon black was Cabot Vulcan carbon black. The carbon microfibers were 0.1 to 100 μm diameter and approximately 1-2 mm in length. Disperbyk 184 dispersant was used.

Sample D used the batting of Sample B, in combination with 6% by weight based upon the total weight of the dried composite carbon black dopant and 4% (same basis) carbon microfiber. The carbon black was Cabot Vulcan carbon black. The carbon microfibers were 0.1 to 100 μm diameter and approximately 1-2 mm in length. Disperbyk 184 dispersant was used.

Sample E used the batting of Sample B, in combination with 6% by weight based upon the total weight of the dried composite carbon black dopant, 4% (same basis) carbon microfiber, and 10% by weight polydimethylsiloxane dopant. The carbon black was Cabot Vulcan carbon black. The carbon microfibers were 0.1 to 100 μm diameter and approximately 1-2 mm in length. Disperbyk 184 dispersant was used.

Sample E has survived more than 100,000 flexure cycles wherein the material was doubled over upon itself without loss of thermal performance.

Example 8 c) Table. Property change of aerogel coupons after compression under the different load.

| | Before Compression | | | | During/After Compression under Different Loads | | | | | |
|---|---|---|---|---|---|---|---|---|---|---|
| Exp. | Avg. Thick. (mm)[1] | Avg. Weight (g) | $\rho_{Average}$ (g/cm³) | Avg. T/C[2] (mW/m K) | Avg. Thick. (mm)[1] | Avg. Weight (g) | $\rho_{Average}$ (g/cm³) | Avg. T/C[2] (mW/m K) | Elastic Modulus (PSI)[3] | Compression Modulus (PSI)[4] |
| Exp-1 | 4.38 | 7.1201 | 0.098 | 12.20 | 4.12 | 7.0951 | 0.104 | 11.33 | 0.73 | 1.61 |
| Exp-2 | 4.43 | 6.7899 | 0.099 | 13.03 | 4.36 | 6.7716 | 0.100 | 13.47 | 0.97 | 4.33 |
| Exp-3 | 5.00 | 7.3495 | 0.089 | 13.10 | 4.67 | 7.3203 | 0.095 | 12.70 | 1.14 | 22.77 |
| Exp-4 | 4.74 | 7.2788 | 0.095 | 13.50 | 2.92 | 7.2435 | 0.153 | 13.33 | 1.45 | 131.20 |

[1]Average of thickness values measured at 5 different areas.
[2]Average of thermal conductivity values measured at 3 different areas.
[3]It was named for the Initial Slope of stress-strain curve.
[4]It was named for the Final Slope of stress-strain curve.

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims that follow. The words "comprise," "comprising," "include," "including," and "includes" when used in this specification and in the following claims are intended to specify the presence of stated features, integers, components, or steps, but they do not preclude the presence or addition of one or more other features, integers, components, steps, or groups thereof.

What is claimed is:

1. A Method of processing an aerogel composite comprising the steps of:
   providing an aerogel composite comprising an aerogel material reinforced with a fibrous material, and
   mechanically compressing the composite aerogel,
   thereby substantially increasing the density of the composite by a factor of up to 10
   wherein the thermal conductivity of the aerogel composite is lowered or substantially unchanged.

2. The method of claim 1 where said aerogel material comprises a metal oxide compound.

3. The method of claim 2 wherein said metal oxide compound comprises silica, alumina, titania, ceria, yttria or any combination thereof.

4. The method of claim 1 wherein the composite is compressed by less than 50% in volume.

5. The method of claim 1 wherein said fibrous material is a non woven material, woven material, loft batting, fibrous batting or any combination thereof.

6. The method of claim 1 wherein said compressing means is a counter rotating roller configuration.

7. The method of claim 1 wherein said compressing means is a press.

8. The method of claim 7 wherein the press is patterned such that said pattern is transferred onto said aerogel composite upon pressing.

9. The method of claim 4 wherein said composite is plastically deformed after mechanical compression.

10. A method for manufacturing a nanoporous body, the method comprising:
    passing the nanoporous body between counter-rotating reduction rollers in order to form a densified nanoporous body with the density ratio of up to 10, wherein the thermal conductivity of the nanoporous body is lowered or substantially unchanged.

11. The method for manufacturing a nanoporous body as defined in claim 10, wherein passing the nanoporous body between counter-rotating reduction rollers results in a densified nanoporous body having a thermal conductivity in the range of 10-50 mW/m-K.

12. The method for manufacturing a nanoporous body as defined in claim 10, wherein passing the nanoporous body between counter-rotating reduction rollers results in a densified nanoporous body having a density in the range of 0.001-0.4 g/cc.

13. The method for manufacturing a nanoporous body as defined in claim 10, wherein the nanoporous body is an aerogel material.

14. The method for manufacturing a nanoporous body as defined in claim 13, wherein the aerogel material is reinforced with fibrous materials.

15. The method for manufacturing a nanoporous body as defined in claim 13, wherein the aerogel material comprises a metal oxide compound.

16. The method of claim 15 wherein said metal oxide compound comprises silica, alumina, titania, ceria, yttria or any combination thereof.

17. The method of claim 10 wherein said densified nanoporous body is compressed by less than 50% in volume.

18. The method of claim 14, wherein said fibrous material is a non woven material, woven material, loft batting, fibrous batting or any combination thereof.

19. The method of claim 10, wherein the surface of said counter-rotating reduction rollers have a relief.

20. The method of claim 19, wherein the relief is transferred onto said aerogel composite upon pressing.

21. The method of claim 10, wherein the densified nanoporous body is positioned adjacent to an intermediate layer to form a laminate.

22. The method of claim 21, further comprising: passing the laminate between counter-rotating reduction rollers in order to form a densified nanoporous body having multiple plies.

23. A method for manufacturing a densified nanoporous body comprising: forming a nanoporous body laminate comprising at least two layers of a nanoporous material having at least one intermediate layer sandwiched between said nanoporous material that can be mechanically compressed; and compressing the nanoporous body laminate to form the densified nanoporous body laminate.

24. The method for manufacturing a densified nanoporous body of claim 23, wherein said mechanical compressing is achieved by passing the nanoporous body laminate between at least one pair of counter-rotating reduction rollers to form the densified nanoporous body laminate.

25. The method for manufacturing a densified nanoporous body of claim 23, wherein said mechanical compressing is achieved by passing the nanoporous body laminate between a pair of press plates to form the densified nanoporous body laminate.

26. The method for manufacturing a densified nanoporous body of claim 24, wherein a relief exists on the surface of said counter-rotating reduction rollers to impart an imprint of said relief on the surface of the densified nanoporous body laminate.

27. The method for manufacturing a densified nanoporous body of claim 25, wherein a relief exists on the surface of at least one of said press plates to impart an imprint of said relief on the surface of the densified nanoporous body laminate.

28. The method for manufacturing a densified nanoporous body of claim 24, wherein said counter-rotating reduction rollers to impart an imprint of said relief on the surface of the densified nanoporous body laminate.

29. A Method of processing an aerogel composite comprising the steps of:

providing an aerogel composite comprising an aerogel material reinforced with a fibrous material, and mechanically compressing the composite aerogel, thereby substantially increasing the density of the composite increasing the density of the composite by a factor of up to 5 wherein the thermal conductivity of the aerogel composite is changed by a factor of up to 2.

30. A Method of processing an aerogel composite comprising the steps of:

providing a silica based aerogel composite comprising an aerogel material reinforced with a fibrous material; and mechanically compressing the composite aerogel wherein silica/fiber ratio of the composite is between about 2.2 and about 6.4.

31. The method of claim 1 wherein the fibrous material used for reinforcement comprises battings, unidirectional fibers, polymeric binders or a mesh.

* * * * *